Oct. 7, 1930.                C. R. MASTIN                1,777,443
                               GASKET
                          Filed Feb. 12, 1929
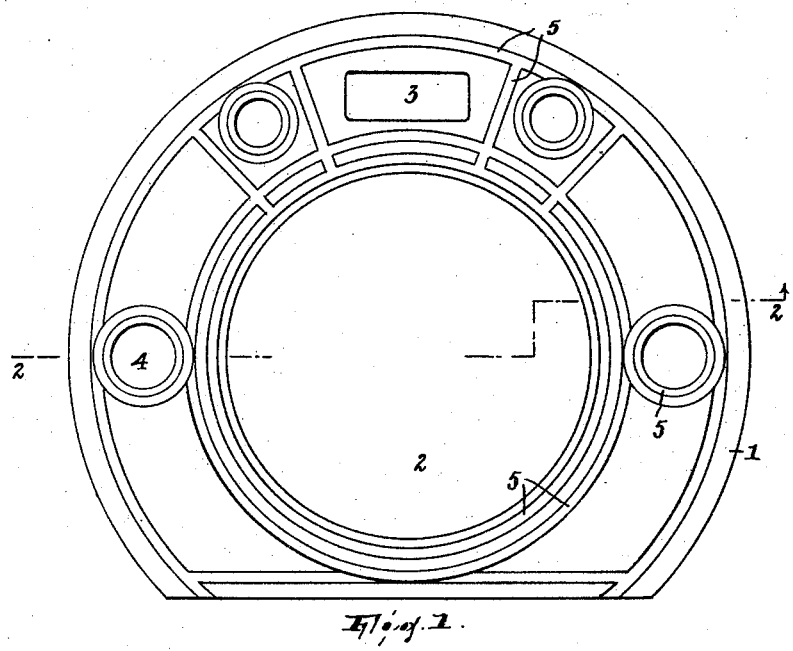
Fig. 1.
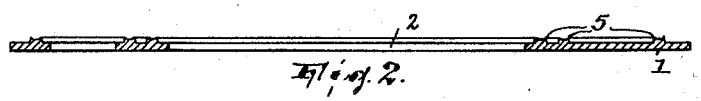
Fig. 2.
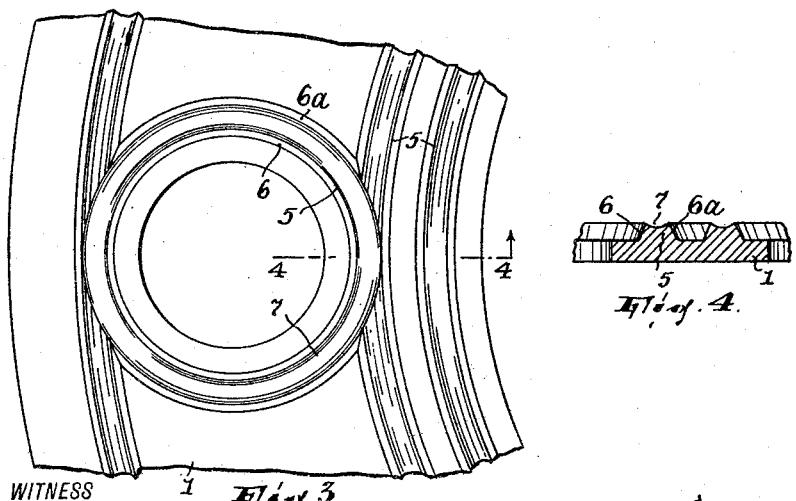
Fig. 3.                    Fig. 4.
WITNESS                                          INVENTOR
Wm. Dzell                                   Charles R. Mastin,
                                            BY
                                            John Pinyard
                                                    ATTORNEY.

Patented Oct. 7, 1930

1,777,443

UNITED STATES PATENT OFFICE

CHARLES R. MASTIN, OF MIDLAND PARK, NEW JERSEY

GASKET

Application filed February 12, 1929. Serial No. 339,386.

This invention relates to elastic flat gaskets for use in sealing the joints in systems containing fluid under pressure. It is known to provide on one face of such a gasket around each opening in the same where leakage is possible an endless sealing rib or the like. One object of this invention is to increase the sealing action of such a rib by recessing its top face or crest (as by a groove coextensive with the rib in length) in such a way that the recess shall be shallow relatively to the depth of height of the rib, whereby when the rib is under compression in the joint the rib will act vacuum-cup fashion on the face of the joint member against which the rib abuts and atmospheric pressure will thus aid in rendering the seal formed as hermetic as possible and at the same time the rib will be substantially as sturdy and hence as resistive to compression as if the recess were absent and as it would not be if the recess were so deep that the rib would be simply divided into two thinner ribs. In these structures, it is frequently found that the compressing of the rib in establishing the joint, with the bulging and other distortion it consequently undergoes, either at once produces or sooner or later encourages the fluid pressure to produce a rolling or tilting over of the rib. Another object of the invention is to construct the rib tapering in cross-section with the basal or wider portion adjoining the general plane of the gasket, and with at least one and preferably each lateral face of the rib thus formed forming an obtuse angle with the adjoining face of the gasket. By this construction the rolling or tilting is opposed, and where the top or crest of the rib is recessed as already stated the rolling or tilting ceases to be a factor in possibly breaking down the vacuum seal that has been established.

In the drawing,

Fig. 1 is a plan of a gasket embodying the invention;

Fig. 2 is a section on line 2—2, Fig. 1;

Fig. 3 is an enlarged fragmentary plan; and

Fig. 4 a section on line 4—4, Fig. 3.

Let 1 designate an elastic gasket of rubber, being a flat ring whose central opening 2 is adapted to match with the main passage in the joint elements to be sealed and between which the gasket is to be arranged and whose opening 3 is a port to match with a port in said joint elements, 4 being openings for bolts or equivalent for securing said elements together and subjecting the gasket to compression. It is usual to provide at least on one face of the gasket an integral-upstanding continuous rib or ribs around each of these openings, and in the example afforded by the drawing this is the case; however, so long as such a rib, constructed as hereinafter described, is provided around any one opening in the gasket where sealing is desired my invention will be performed. Such a rib is indicated generally at 5 in Figs. 1 and 2.

Referring to Figs. 3 and 4, the rib has its transverse dimension at its base, i. e., in the plane of the gasket surface from which it rises, greater than its transverse dimension at its crest—in other words, in section it tapers from its basal plane to its crest. Whether one or both lateral faces 6 6$^a$ of the rib are inclined the result is that the cross-sectional taper form of the rib is in itself at least an obstacle to the rib tilting or rolling and so the integrity of the seal is increased. Usually, however, at least the relatively outer face 6$^a$ of the rib will be inclined so as to form with the general plane of the gasket an obtuse angle, thus to reinforce the rib and make it active after the manner of a dam against the fluid pressure active on its inner face 6. And in the preferred form both faces will be inclined so as to form obtuse angles with said plane, and in this specific form the rib will have no tendency to roll or tilt over as an incident of the compression and will also substantially oppose such action as an incident of the fluid pressure.

The top or crest of the rib is provided with a recess which is shallow relatively to the depth or height of the rib itself, as by forming therein a shallow groove 7 co-extensive therewith. This acts, as stated, after the manner of a vacuum-cup when the rib, in the compression of the gasket, is pressed against the adjoining face of one of the joint elements, and yet the rib will be substantially as sturdy and hence as resistive to compression as if the recess were absent and as it would not be if the recess were so deep that the rib would be simply divided into two thinner ribs. Sometimes a particle of grit not actually large enough to span the top or crest of a rib will form a leakage vent; but when the rib is recessed as I have stated in such a case one or the other or both of the fillets existing at each side of the recess will usually remain effective to maintain the seal.

The fact that the groove is formed in cross-section, as shown in the drawing, concave (to wit curved) is not without its importance; thereby the material of the rib flanking each side of the groove is calculated under pressure to be simply compressed and is not susceptible to tilting one way or the other as would be possible were the groove angular in cross-section.

The term "rib" as herein used is meant to define any elongated elevation on the gasket, whatever the width thereof.

Having thus fully described my invention, what I claim is:

1. An elastic flat gasket having an opening therethrough and upstanding from one face of the gasket and around such opening an integral elastic rib, said rib being tapering in cross-section and wider at its base than at its crest and having a vacuum-cup-forming groove at its crest substantially coextensive with the rib lengthwise thereof and which is shallow relatively to the depth of the rib.

2. An elastic gasket having an opening therethrough and upstanding from one face of the gasket and around such opening an integral elastic rib having a vacuum-cup-forming recess at its crest which is shallow relatively to the depth of the rib.

3. An elastic flat gasket having an opening therethrough and upstanding from one face of the gasket and around such opening an integral elastic rib, said rib being tapering in cross-section and wider at its base than at its crest and having a cross-sectionally concave vacuum-cup-forming recess at its crest which is shallow relatively to the depth of the rib.

In testimony whereof I affix my signature.

CHARLES R. MASTIN.